United States Patent [19]

Visk

[11] Patent Number: 5,771,930

[45] Date of Patent: Jun. 30, 1998

[54] SPRINKLER AND ROOT FEEDER VALVE ASSEMBLY

[75] Inventor: John R. Visk, Chicago, Ill.

[73] Assignee: Fleming Sales Company, Inc., Lombard, Ill.

[21] Appl. No.: 764,717

[22] Filed: Dec. 10, 1996

[51] Int. Cl.$^6$ ..................................................... F16K 11/08
[52] U.S. Cl. ....................... 137/625.47; 137/268; 111/7.4
[58] Field of Search ............................... 137/625.47, 268; 111/7.4; 239/315

[56] References Cited

U.S. PATENT DOCUMENTS

| | | | |
|---|---|---|---|
| 2,787,499 | 4/1957 | Rolston | 239/315 X |
| 2,996,083 | 8/1961 | Huska | 137/625.47 X |
| 3,618,539 | 11/1971 | Daniels . | |
| 3,783,804 | 1/1974 | Platz . | |
| 3,788,355 | 1/1974 | Wood | 137/625.47 X |
| 3,915,191 | 10/1975 | Eisenthal et al. | 137/268 |
| 4,169,420 | 10/1979 | Kresge, Sr. | 111/7.4 X |
| 4,318,424 | 3/1982 | Bajka . | |
| 4,432,291 | 2/1984 | Shirley . | |
| 4,653,537 | 3/1987 | Voith | 137/625.47 X |
| 4,671,311 | 6/1987 | Hepperle et al. . | |
| 4,705,218 | 11/1987 | Daniels . | |
| 4,846,406 | 7/1989 | Christy . | |
| 4,915,133 | 4/1990 | Harrison | 137/625.47 |
| 4,960,584 | 10/1990 | Brown . | |
| 5,253,807 | 10/1993 | Newbegin . | |
| 5,261,607 | 11/1993 | Rosenberg . | |
| 5,303,729 | 4/1994 | DeMarco . | |
| 5,314,116 | 5/1994 | Krauth et al. . | |
| 5,322,085 | 6/1994 | Prothe . | |
| 5,423,348 | 6/1995 | Jezek et al. . | |
| 5,441,073 | 8/1995 | Hoadley . | |
| 5,466,228 | 11/1995 | Evans . | |

Primary Examiner—John Fox
Attorney, Agent, or Firm—Wallensteing & Wagner, Ltd.

[57] ABSTRACT

A sprinkler and root feeder valve assembly useful for directing the flow of liquid in one of two directions for use as either a sprinkler or a root feeder for plant maintenance is disclosed. The valve assembly includes a one-piece valve housing body having a central hub and two diametrically opposite arm members for receiving and transporting liquid. The central hub is adapted for receiving a valve drum which is rotatable into several positions and adapted for controlling the volume and directing the flow of liquids through the assembly.

19 Claims, 3 Drawing Sheets

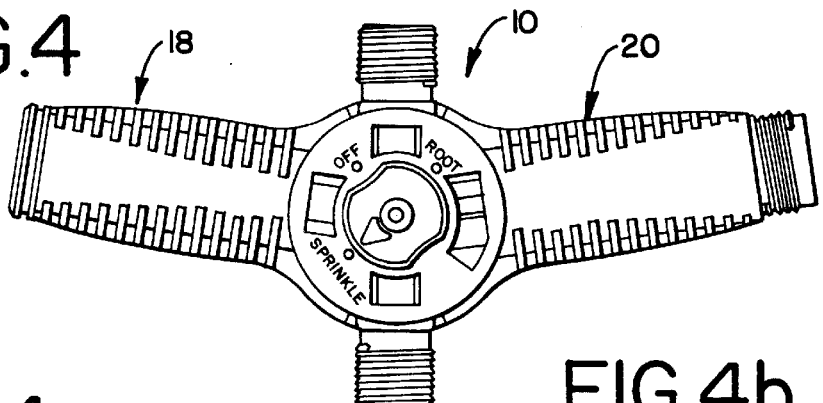
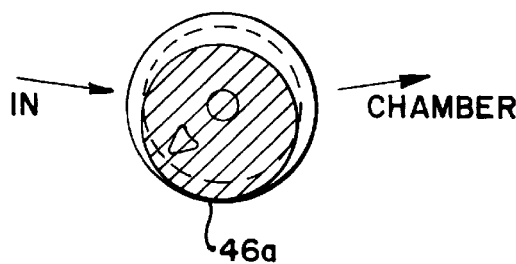
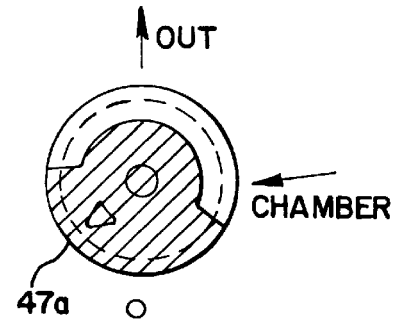
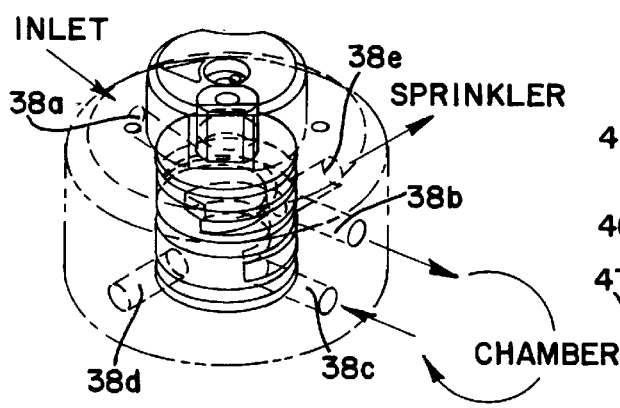
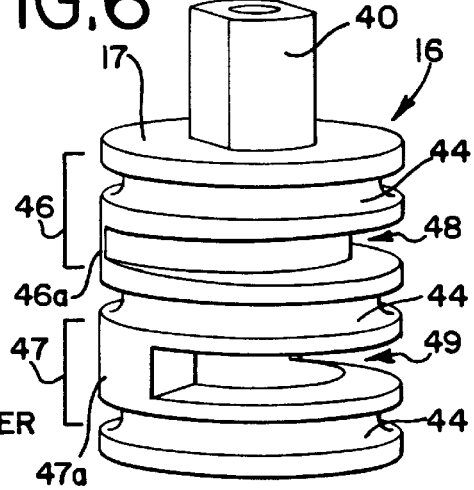
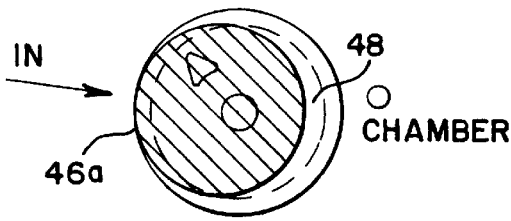
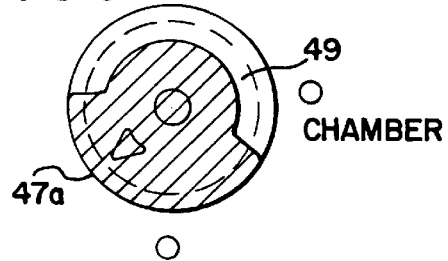

SPRINKLER AND ROOT FEEDER VALVE ASSEMBLY

TECHNICAL FIELD

This invention relates to a liquid dispensing device, and more particularly to a sprinkler and root feeder valve assembly adjustable in one of at least two directions for directing and controlling the flow of water alone or in combination with a water-soluble chemical to function as either a sprinkler or a root feeder system.

BACKGROUND OF THE INVENTION

Sprinkling and irrigation systems and devices for use by both the consumer and on a commercial basis, have been in existence for a number of years. Traditionally, a sprinkler or irrigation system provides for above ground watering or dispensing of fertilizers, herbicides, pesticides or other useful chemicals in a spray application. Alternatively, root feeding devices have also been described. Such devices typically include a nozzle inserted into the ground through which fertilizers or other chemicals are fed directly through to the root system.

While the prior art has described devices which perform separate sprinkling or root feeding functions, the prior art does not describe a device which is capable of providing a choice of either sprinkling or root feeding in a single device. Therefore, if both sprinkling and root feeding are desired to treat a lawn, garden or other area, a separate sprinkler device and a separate root feeding device, including exchange and setup of these separate devices, is usually required. In addition, both of these devices often require a garden hose connection as a source of water. Again, each device would likely need individual set-up and use, as the typical homeowner has only one water hose connection. Even for users which may have multiple water supply units, such as nurseries, having the ability to switch between sprinkling and root feeding without moving and exchanging systems, or using multiple systems, would be less expensive, less time-consuming and convenient.

Consequently, there remains a need for a device which is easily interchangeable between a sprinkler and a root feeder in a single device, without the requirement of setting up separate systems. The present invention provides for convenient selection of either a foliage or a root treatment for trees, shrubs, and other plants, using plain water or including a mixture of selected chemicals, in a single device. As a sprinkler, a sprayer unit supplies a rain-like liquid application over a large area, encouraging natural absorption by grass, gardens, shrubs, trees and other foliage. As a root feeder, a hollow tube is insertable into the ground, both securing the device in place, and supplying the roots with an effective application of water, or a solution of chemicals and nutrients.

The novel interchangeability of the present invention between either a sprinkler or a root feeder is achieved through the use of a unique valve assembly. The valve assembly includes a housing equipped with a valve drum having a series of grooves or slots separated by sealing O-rings. The grooves align with channels leading to either an outlet for the sprinkler, or an outlet for the root feeder, depending on the chosen use. Either option is easily selected through rotation of an external knob connected to the valve drum.

The present device also allows for the addition of any desired water-soluble chemical, which after adding to a chamber built into the unit, will be gradually dissolved into the water as it circulates through the system for either sprinkling or root feeding application. In sum, the present device provides a complete, convenient, effective and economical method for plant treatment for use by the homeowner or on a commercial scale.

SUMMARY OF THE INVENTION

The invention provides a valve assembly useful for directing the flow of liquid in one of two directions. The valve assembly includes a one-piece valve housing having a central hub adapted for receiving a valve drum. Positioned on either side of the central hub are a pair of diametrically opposite, hollow arm members projecting radially outward, the first arm member adapted for receiving a liquid, and the second arm member having a chamber for containment and dissolution of chemicals and nutrients. An upwardly positioned top outlet port and an opposed downwardly positioned bottom outlet port are also located around the central hub. The valve drum is rotatable between at least two positions for directing the flow of liquid from the first and second arm members through either the top outlet port or the bottom outlet port.

Other advantages and aspects of the present invention will become apparent upon reading the following description of the drawings and the detailed description of the invention.

BRIEF DESCRIPTION OF THE DRAWINGS

FIG. 4 is a front view of the valve housing of the sprinkler and root feeder valve assembly of FIG. 1 showing the external adjusting knob in the sprinkler position;

FIG. 4a is a cross sectional top view of the top sector portion of the drum valve in position during the sprinkler function;

FIG. 4b is a cross sectional top view of the bottom sector portion of the drum valve in position during the sprinkler function;

FIG. 5 is a perspective view of the valve drum positioned within the central hub shown in phantom and illustrating the flow path during the sprinkler function of the sprinkler and root feeder valve assembly of FIG. 1;

FIG. 6 is an enlarged side view of the valve drum of the sprinkler and root feeder valve assembly of FIG. 1;

FIG. 6a is a cross sectional top view of the top sector portion of the drum valve in a closed position; and, FIG. 6b is a cross sectional top view of the bottom sector portion of the drum valve in a closed position.

DETAILED DESCRIPTION OF THE PREFERRED EMBODIMENT

Figure 1:
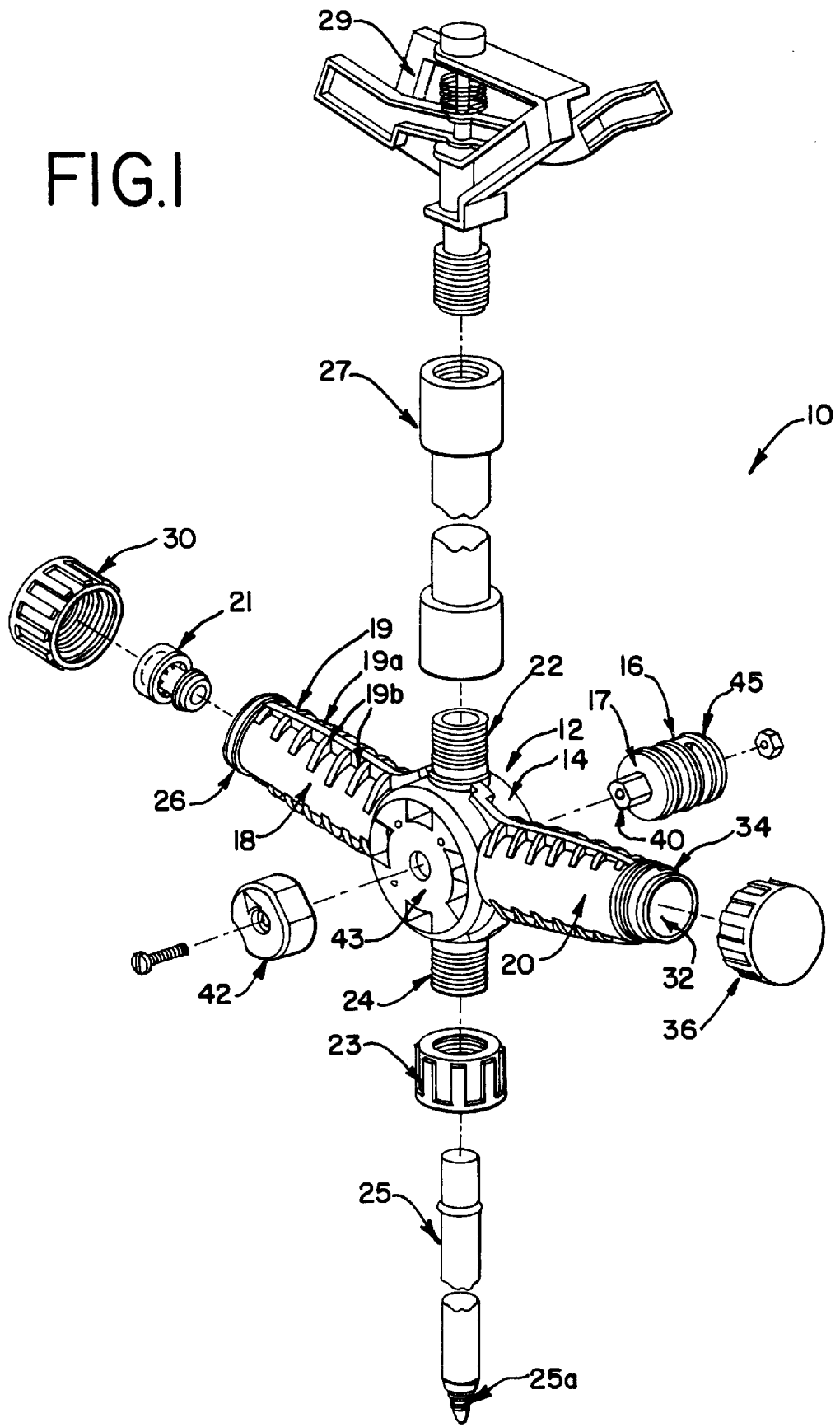
FIG. 1 is an exploded perspective view of a sprinkler and root feeder valve assembly incorporating features of the present invention.

While the invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

The sprinkler and root feeder valve assembly of the present invention is shown in FIG. 1, generally designated as reference numeral 10. The valve assembly 10 is comprised essentially of a generally T-shaped, one-piece housing body 12 having a pair of diametrically opposed hollow arm members 18, 20. The generally rectangular or oblong arm members 18, 20 are located on either side of a central, circular hub 14. The central hub 14 is adapted for receiving a valve drum 16 useful for directing the flow of liquid through the assembly. Positioned at approximately right angles to the arm members 18, 20, is a top outlet port 22, and an opposed bottom outlet port 24, either of which the liquid exits the assembly.

Both the top outlet port 22 and the bottom outlet port 24 are essentially threaded attachment ports. The top outlet port 22 is adapted for receiving a riser tube 27, which in turn receives a standard "Spike" type impulse sprayer 29, for spraying trees, lawns, gardens, etc., above ground. The top outlet port 22 can also be fitted with a cap (not shown) for sealing the port 22 when the valve assembly 10 is used exclusively as a root feeder.

The bottom outlet port 24 is adapted for receiving a threaded coupler 23. As shown in FIG. 1, the threaded coupler 23 receives and secures a hollow tube 25 to the bottom outlet port 24. The end tip 25a is preferably pointed for ease in penetrating the ground for both securing the valve assembly 10 in an upright position, and ensuring enough depth to reach the root system. Further, the end tip 25a of the hollow tube 25 is perforated around its circumference for self-cleaning, and to facilitate lateral water flow into the root system.

Figure 2:
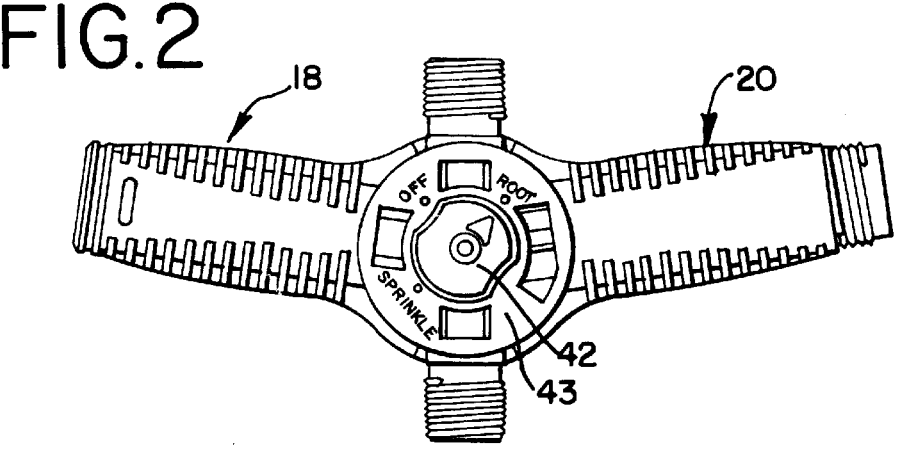
FIG. 2 is a front view of the valve housing of the sprinkler and root feeder valve assembly of FIG. 1 showing the external selection knob in the root feeder position.

As shown in FIGS. 1, 2 and 4, the sprinkler and root feeder valve assembly 10 comprises opposed first 18 and second 20 arm members. The first arm member 18 is adapted for coupling to a liquid source, typically a standard garden hose. In particular, the inlet end 26 of the first arm member 18 includes a plurality of circumferential ridges 28 comprising one half of a snap fit for receiving a threaded coupler 30. The coupler 30 is pressed and "snapped" onto the inlet end of the first arm member 18. The freely rotatable threaded coupler 30 is of a standard type for receiving a garden hose, and includes a washer and a strainer (not shown) for preventing solids from entering the housing body 12. The first arm member 18 is also fitted with a diaphragm-type vacuum breaker 21 to prevent a backflow of water into the water source. The first arm member 18 may also be fitted with an integral or external "off" valve.

After water enters the first arm member 18, it travels through a top sector inlet passage 38a, allowing water to travel from the first arm member 18 to the central hub 14. The water then enters the valve drum 16 positioned within the central hub. When the valve drum 16 is in an open position, as will be described, the water travels through the valve and into the second arm member 20, and ultimately to the top outlet port 22 or the bottom outlet port 24.

A mixing chamber 32 comprises the internal space of the second arm member 20. The end of the second arm member 20 is equipped with an end cap 36, which when removed, provides access to the mixing chamber 32 for depositing water-soluble chemicals, such as fertilizers, herbicides, and pesticides useful in lawn and garden maintenance. The chemicals may be added as pre-measured cartridges for proper application, or may also be deposited in a bulk, pellet or liquid form. As water enters the second arm member 20 through a chamber inlet passage 38b, the water circulates through the mixing chamber 32, effectively dissolving the appropriate water-soluble chemical into the water and creating a solution for either sprinkling or root feeding application. Alternatively, as the chemical is exhausted, or after removal, water continuously circulates through the mixing chamber 32, effectively flushing the chamber and minimizing any cross-contamination between chemicals.

As shown in FIG. 1, both the first arm member 18 and the second arm member 20 are constructed with an outer reinforcement structure 19. The reinforcement structure 19 includes a central spine portion 19a with a plurality of outwardly projecting ribs 19b. Both the central spine portion 19a and the ribs 19b run the entire center length of both the top and bottom of the arm members 18, 20. The reinforcement structure 19 adds strength to the valve assembly, especially because the arm members 18, 20 are used as handles to press and secure the assembly, specifically the root feeder and support tube 25, into the ground. The reinforcement structure 19 keeps the arm members 18, 20 horizontal and rigid, such that when force is applied, the arm members do not collapse under the force.

The arm members 18, 20 are interconnected to one another through a central, circular hub 14. The interior of the central hub 14 has a substantially smaller diameter than the outer diameter of the central hub which is constructed using a double wall construction for strength. The interior of the central hub 14 is adapted for receiving the valve drum 16. The interior of the central hub 14 further includes a plurality of inlet and outlet passages 38a–e for fluid flow to and from the arm members 18, 20, through the central hub, and eventually to the top 22 and bottom 24 outlet ports, as will be described.

The central hub 14, in combination with the valve drum 16 and the plurality of inlet and outlet passages 38a–e, is the distribution point for the liquid, directs the flow of liquid, and contributes to creating an optional chemical mixture, for either sprinkling or root feeding. The valve drum 16 acts as the liquid flow directional means, because depending upon the rotation of the valve drum, the valve assembly 10 will function as either a sprinkler system or as a root feeder.

As shown in FIG. 6, the one-piece valve drum 16 has a generally cylindrical shape. The cylindrical valve drum 16 includes a rectangular cross sectional shaft 40, fixedly secured coaxially of the cylindrical valve drum 16 at an end wall 17 of the valve drum. The shaft 40 is coupled to a selection knob 42 for rotational operation of the valve drum 16 (FIG. 1). The valve drum 16 is centrally positioned within the interior of the central hub 14 by the selection knob 42 in combination with a cap 43. The cap 43 itself is not a separate piece, but is integrally molded and formed as one with the central hub 14. Specifically, the valve drum 16 is held in position by a nut and bolt assembly, wherein the bolt passes through and secures the knob 42 to the cap 43 and finally through the shaft 40 of the valve drum. The cap 43 is indexed with the proper settings for selecting the sprinkler, root feeder or "off" position for the valve assembly 10 by lining up the arrow on the control knob 42 with the desired setting. (FIGS. 2 and 4).

Figure 3:
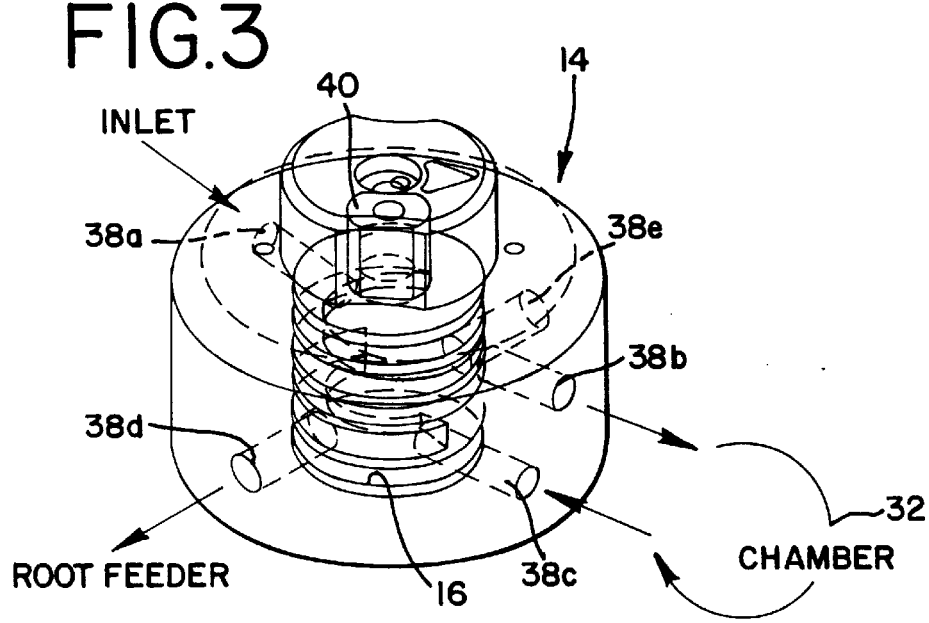
FIG. 3 is a perspective view of the valve drum positioned within the central hub shown in phantom and illustrating the flow path during the root feeder function of the sprinkler and root feeder valve assembly of FIG. 1.

As will be described, rotation of the control knob 42 to the desired function indicated on the cap 43 controls the positioning of the valve drum 16, and in turn, effectively controls the direction and volume of the liquid flow thorough the valve assembly 10. FIG. 3 illustrates the liquid flow direction when the valve assembly 10 is in a root feeder function, while FIG. 5 illustrates the liquid flow direction when the valve assembly is in a sprinkler function. FIG. 6 provides a detailed illustration of the unique configuration of the valve drum 16.

Specifically, and as shown in detail in FIG. 6, the outer circumference of the valve drum 16 is not a smooth surface, but includes a series of annular grooves 44. The annular grooves 44 divide the valve drum 16 into a top sector portion 46 and a bottom sector portion 47. As will be described below, the top sector portion 46 and the bottom sector portion 47 of the valve drum 16 act to direct the flow and control the volume of liquid through the valve drum. The first set of annular grooves 44 are generally an even depth about the entire circumference of the valve drum 16. These grooves 44 are useful as seats for O-rings 45 which separate the top sector portion 46 from the bottom sector portion 47, as well as providing an effective seal against liquid leakage within the valve drum 16 and between the sectors. Separating the top sector portion 46 from the bottom sector portion 47 is essential for providing the means for effectively changing and controlling the direction of the liquid flow through the assembly.

The direction and volume of the fluid flow through the valve drum 16 is generally controlled by the positioning of a top sector passage 48 located in the top sector portion 46, and a bottom sector passage 49 located in the bottom sector portion 47, of the valve drum 16. Each sector passage has a slightly different configuration, which contributes to changing and guiding the direction and volume of the liquid flow. As shown in FIG. 6a, the top sector passage 48 has a half-moon shape formed from a slightly off-set positioning of the circular cross section of the top sector portion 46 from the center of the valve drum 16. Specifically, the top sector passage 48 controls the "on" and "off" flow of fluid, as well as the volume of fluid through the assembly 10. Rotation of the valve drum 16 results in a cross section of variable area of the top sector passage 48 to be exposed to the top sector inlet 38a, thus varying the flow volume of liquid. On the other hand, the bottom sector passage 49 controls the direction of the flow of fluid. As shown in FIG. 6b, the bottom sector passage 49 has a generally C-shaped, semicircular configuration.

Figure 2A:
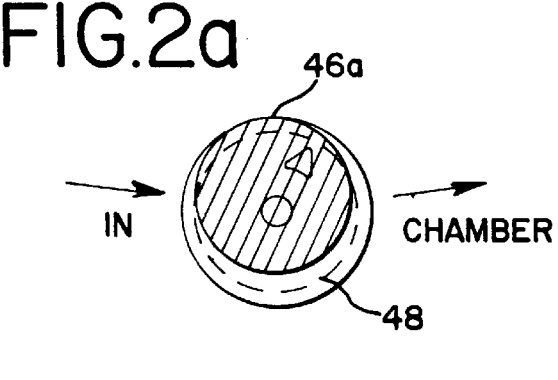
FIG. 2a is a cross sectional top view of the top sector portion of the drum valve in position during the root feeder function.
Figure 2B:
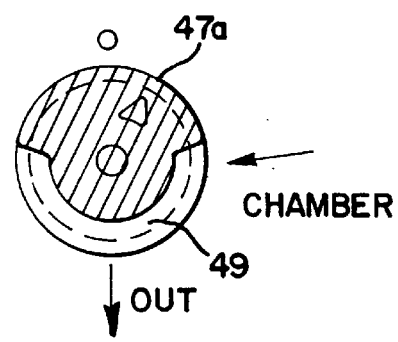
FIG. 2b is a cross sectional top view of the bottom sector portion of the drum valve in position during the root feeder function.

As illustrated in FIGS. 2a, 2b, 4a, 4b, 6a and 6b, depending upon the positioning of the top sector passage 48 and the bottom sector passage 49, the direction of the flow of liquid is changed such that the valve assembly 10 can be used as either a sprinkler, a root feeder system, or can be completely shut-off. FIGS. 2a and 2b illustrate the positioning of the top 48 and bottom 49 sector passages when the assembly is functioning as a root feeder system. FIGS. 4a and 4b illustrate the positioning of the top 48 and bottom 49 sector passages when the assembly is functioning as a sprinkler system. To achieve the desired function, when the valve 16 is rotated, the top sector passage 48 communicates only with the top sector inlet 38a and the chamber inlet 38b. Similarly, the bottom sector portion 47 with the bottom sector passage 49, functions to direct the flow of fluid through the top outlet port 22, for sprinkling, or to the bottom outlet port 24 for root feeding. Thus, the bottom sector passage 49 is in communication only with the chamber outlet 38c, the root feeder outlet 38d and the sprinkler outlet 38e.

Rotation of the valve 16 through a small angle has the effect of varying the alignment of the cross sectional area of the top sector passage 48 to the top sector inlet 38a, thus varying the flow rate of fluid. When the valve 16 is in this position, the bottom sector passage 49 aligns with the chamber outlet 38c and the root feeder outlet 38d, creating a fluid flow path from the chamber 32 to the bottom outlet port 24 (FIG. 3). Similarly, rotation of the valve 16 into a second position, the bottom sector passage 49 aligns with the chamber outlet 38c and the sprinkler outlet 38e, creating a fluid flow path from the chamber 32 to the top outlet port 22 (FIG. 5).

The top sector portion 46 functions to shut the flow of fluid off completely. To conserve water and/or permit loading the chamber 32 of the second arm member 20 with an appropriate water-soluble chemical or nutrient, the valve drum 16 can be selected to an "off" position. FIGS. 6a and 6b show the position of the top sector 46 and the bottom sector 47 when the valve drum 16 is in the closed position. In the closed position, the semicircular solid wall 46a is positioned to block the flow of water from the first arm member 18 at the top sector inlet 38a, thus blocking the initial flow of water into the central hub and the valve drum 16.

The housing body 12 is preferably constructed as a single piece, including the first and second arm members 18, 20, and the top and bottom outlet ports 22, 24 and the central hub 14 with its integral cap 43. The housing body 12 can be constructed from any suitable plastic. Plastic is the preferred material for its durability and resistance to the elements. Preferably, the housing body 12 is injection molded for strength and manufacturing convenience.

The valve assembly 10 of the present invention provides the advantages of easy selection of either a sprinkler or a root feeder in one device. The assembly also provides a convenient means for dispensing chemicals, such as pesticides or fertilizers as either a sprinkler or a root feeder.

While specific embodiments have been illustrated and described, numerous modifications are possible without departing from the spirit of the invention, and the scope of protection is only limited by the scope of the accompanying claims.

What I claim is:

1. A valve assembly useful for directing the flow of liquid in one of two directions comprising:

a one-piece valve housing having a central hub;

a pair of diametrically opposite, first and second hollow arm members projecting radially outward;

the first arm member adapted for receiving a liquid;

the second arm member including a removable closure on an opposed end;

an upwardly positioned top outlet port and an opposed downwardly positioned bottom outlet port;

a valve drum secured within the central hub, the valve drum being rotatable between at least a first position and a second position and adapted for directing the flow of liquid from the first to the second arm member, and from the second arm member through either the top outlet port or the bottom outlet port.

2. The valve assembly of claim 1 wherein the first arm member further includes a threaded connector means for connecting to a liquid source and the second arm member further includes an interior chamber for receiving and recirculating liquid.

3. The valve assembly of claim 2 wherein the chamber within the second arm member is further adapted for receiving and mixing a water-soluble chemical.

4. The valve assembly of claim 1 wherein the first and second arm members and the top outlet port and the bottom outlet port are disposed at substantially right angles from each other about the outer circumference of the central hub of the valve housing.

5. The valve assembly of claim 1 wherein the hub includes an inner section having a plurality of inlet and outlet passages for communication to the first and second arm members, the inlet and outlet passages further useful for cooperating with the valve drum for communication of the flow of liquid to either the top outlet port or the bottom outlet port.

6. The valve assembly of claim 5 wherein the inlet and outlet passages cooperate to permit the flow of liquid from the first arm member through the central hub and recirculates through the chamber of the second arm member, dissolving the water-soluble chemical into the liquid forming a solution for distribution outwardly from either the top outlet port or the bottom outlet port.

7. The valve assembly of claim 1 wherein the upwardly positioned top outlet port is adapted for receiving a sprayer attachment for distributing liquid from the valve housing.

8. The valve assembly of claim 1 wherein the downwardly positioned bottom outlet port is adapted for receiving a securing and dispensing means.

9. The valve assembly of claim 8 where in the securing and dispensing means includes a hollow tube having an opposed tapered end insertable into the ground for securing the valve housing and providing a means for dispensing liquid into the ground.

10. The valve assembly of claim 1 wherein the valve drum has a generally cylindrical shape for seating within the inner section of the hub and further includes a means for rotating the valve drum within the central hub for communication with the inlet and outlet passages.

11. The valve assembly of claim 10 wherein the means for rotating the valve drum includes a control knob, the valve drum further including a circumferential top sector passage and a circumferential bottom sector passage for selectively communicating with the inlet and outlet passages in the hub upon rotation of the control knob.

12. The valve assembly of claim 11 wherein when the valve drum is rotated into a first position, the top sector passage permits the flow and controls the volume of liquid from the first arm member through the central hub to the second arm member and the bottom sector passage directs the flow of liquid from the second arm member downwardly through the bottom outlet port.

13. The valve assembly of claim 12 wherein when the valve drum is rotated into a second position, the top sector passage permits the flow and controls the volume of liquid from the first arm member through the central hub to the second arm member and the bottom sector passage directs the flow of liquid from the second arm member upwardly to the top outlet port.

14. The valve assembly of claims 12 wherein when the valve drum is rotated into a third position, the top sector passage prevents the flow of liquid from the first arm member through the central hub to the second arm member.

15. A valve assembly useful for directing the flow of water in one of at least two directions comprising:

a valve housing having a generally circular central hub adapted for receiving a valve drum having a top sector passage and a bottom sector passage;

a pair of diametrically opposite arm members projecting radially outward, the first arm member adapted for receiving a liquid and the second arm member adapted for receiving and recirculating the liquid;

at least one passage for interconnecting the first arm member to the second arm member through the central hub;

an upwardly positioned top outlet port and an opposed downwardly positioned bottom outlet port, each outlet port positioned at right angles adjacent to the first arm member and the second arm member;

the valve drum being rotatable between a first position directing the flow of liquid through the top outlet port for spraying water on the foliage of plants; and, a second position directing the flow of water through the bottom outlet port to the root system of plants.

16. The valve assembly of claim 15 wherein the second arm member includes a chamber adapted for receiving and dispensing a water-soluble chemical.

17. The valve assembly of claim 15 wherein the central hub further includes a plurality of inlet and outlet passages for use in connection with the valve drum for directing and controlling the volume of fluid flow thorough the assembly.

18. The valve assembly of claim 15 wherein the valve drum is further divided into a top sector portion and a bottom sector portion, the top sector portion for controlling the fluid flow volume and the bottom sector portion for directing the fluid flow through the assembly.

19. The valve assembly of claim 15 wherein the valve drum is rotatable into a third position for preventing the flow of fluid from the first arm member through the central hub.

* * * * *